United States Patent
Tjew

(10) Patent No.: US 6,930,684 B2
(45) Date of Patent: Aug. 16, 2005

(54) METHOD AND APPARATUS FOR ACCELERATING OCCLUSION CULLING IN A GRAPHICS COMPUTER

(75) Inventor: Kat-Fung Tjew, Austin, TX (US)

(73) Assignee: Broadizon, Inc., Austin, TX (US)

( * ) Notice: Subject to any disclaimer, the term of this patent is extended or adjusted under 35 U.S.C. 154(b) by 370 days.

(21) Appl. No.: 10/259,685

(22) Filed: Sep. 27, 2002

(65) Prior Publication Data

US 2004/0061699 A1 Apr. 1, 2004

(51) Int. Cl.$^7$ ............................................. G06T 15/00
(52) U.S. Cl. ............................................. 345/421
(58) Field of Search .......................... 345/419, 420, 345/421, 422

(56) References Cited

PUBLICATIONS

Watt et al., Advanced Animation and Rendering Techniques, 1992, ACM Press, pp. 3, 127–130.*

* cited by examiner

Primary Examiner—Almis R. Jankus
(74) Attorney, Agent, or Firm—Antony P. Ng; Dillon & Yudell LLP

(57) ABSTRACT

A method for accelerating occlusion culling in a graphics computer is disclosed. A depth test is performed on a fragment for a first time to determine if the fragment is visible. The fragment can be marked as potentially visible if the depth test concluded that the fragment is visible. Subsequently, the depth test is performed on the fragment for a second time to determine if the fragment is visible. If the depth test concludes that the fragment is visible, graphics processing for the fragment can be stopped at this point.

15 Claims, 5 Drawing Sheets

METHOD AND APPARATUS FOR ACCELERATING OCCLUSION CULLING IN A GRAPHICS COMPUTER

BACKGROUND OF THE INVENTION

1. Technical Field

The present invention relates to a method and apparatus for processing graphical data in general, and in particular to a method and apparatus for occlusion culling within a graphics processing system. Still more particularly, the present invention relates to a method and apparatus for accelerating occlusion culling in a graphics computer.

2. Description of the Related Art

In a graphics computer, a two-dimensional (2D) display screen is commonly used to display three-dimensional (3D) representations of an object. An object to be rendered is initially divided into multiple primitives. Primitives are basic components of a graphical object and may be defined by geometries of a point, a line, or a polygon. The primitives are subsequently fed through a graphics pipeline in which various types of graphical processing are performed and the results are then rendered on a 2D display screen.

Since each primitive may contain thousands of fragments, a relatively large amount of processing time can be spent to render all the fragments within a primitive. However, some of the processing time are wasted because not all of the primitives are ultimately visible to a viewer. For example, a car may have a hierarchical data structure with different groupings for components such as body panels, an engine, a drive train, wheels, etc. Some of the data structures, such as the engine, are quite complex and may potentially make up of thousands or millions of primitives. If the car is displayed from the top with the hood closed, a typical graphics computer may spend a large amount of time to process the multitude of primitives for the engine with the end result of not a single primitive for the engine needs to be displayed. Similarly, other portions of the automobile, such as the wheels or drive train, may also be entirely occluded. Needless to say, the amount of time spent on processing all of the occluded primitives greatly decreases the speed and efficiency of the typical graphics computer.

Consequently, it would be desirable to provide a method and apparatus for accelerating occlusion culling in a graphics computer.

SUMMARY OF THE INVENTION

In accordance with a preferred embodiment of the present invention, a depth test is performed twice on each fragment within a primitive before vertex shading is performed on the primitive. On a fragment level, a depth test is performed on a fragment for a first time to determine if the fragment is visible. The fragment can be marked as potentially visible if the depth test concluded that the fragment is visible. Subsequently, the depth test is performed on the fragment for a second time to determine if the fragment is visible. If the depth test concludes that the fragment is visible, graphics processing for the fragment can be stopped. On a primitive level, if none of the fragments within the primitive is visible, graphics processing for the primitive can be stopped at such point. On a vertex array level, if none of the primitives within the vertex array is visible, graphics processing for the vertex array can be stopped at such point.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of data processing systems under a number of different operating systems. The data processing system may be, for example, a personal computer, a mid-range computer, a mainframe computer, or a console gaming system. In addition, the data processing system may be a stand-alone system or part of a network such as a local-area network (LAN) or a wide-area network (WAN).

Figure 1:
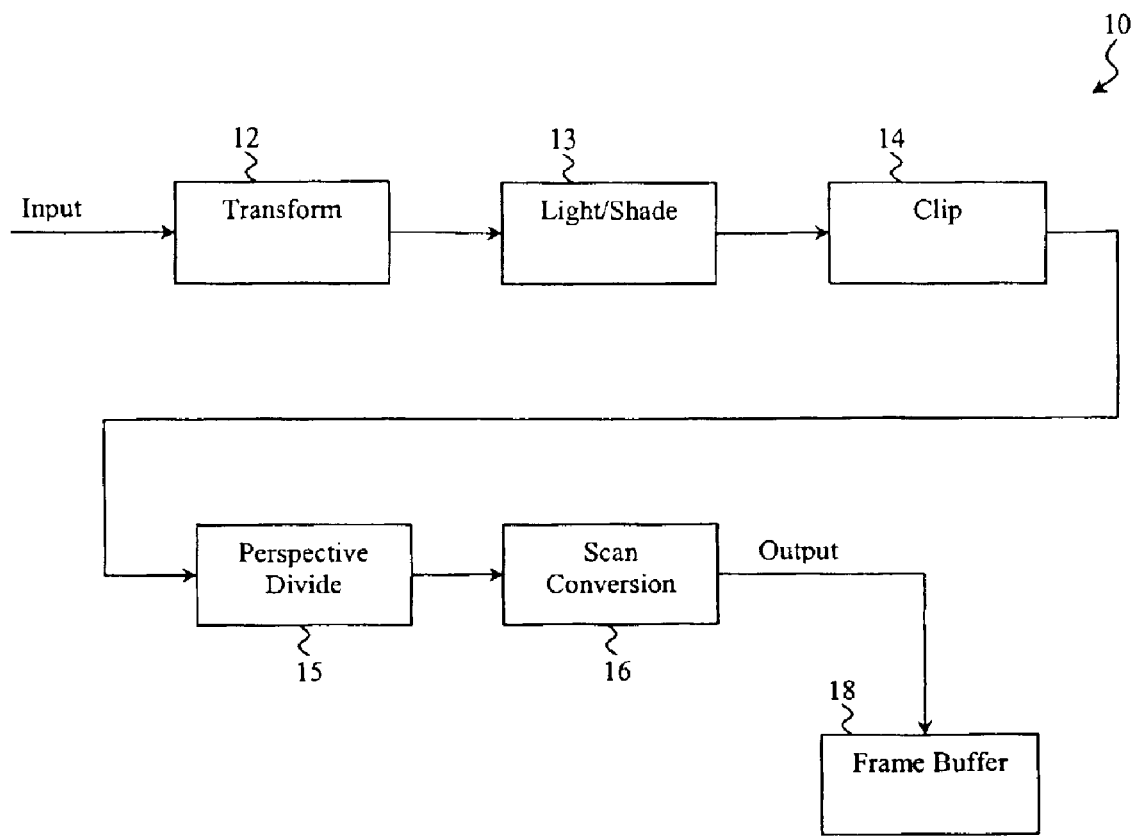
FIG. 1 is a block diagram of a graphics pipeline according to the prior art.

Referring now to the drawings and in particular to FIG. 1, there is depicted a block diagram of a graphics pipeline 10, according to the prior art. As shown, graphics pipeline 10 includes a transform unit 12, a light/shade unit 13, a clip unit 14, a perspective unit 15 and a scan conversion unit 16. Transform unit 12 converts primitive data input from a first coordinate space to a second coordinate space. Light/shade unit 13 applies lighting and shading to the transformed primitives, and may additionally provide texture mapping. Transform unit 12 and light/shade unit 13 may be combined to perform a graphics processing procedure commonly known as vertex shading. Clip unit 14 clips the primitives to a viewing volume and may further clip the primitives relative to one or more arbitrary clipping planes. Within clip unit 14, the primitives are modified so that only the portion of the primitives located inside the viewing volume becomes visible. Perspective divide unit 15 divides the coordinates of all the primitives by w to transform the primitive data from homogeneous to three-dimensional coordinates. To provide perspective projection, the coordinates are further divided at perspective divide unit 15 by the depth component so that objects farther away appear smaller. Within scan conversion unit 16, vertex coordinates and attributes are converted into pixel colors and depths. The data output from graphics pipeline 10 includes pixel coordinates (or addresses) x and y, pixel depth z, and color r, g, b, a or color index. The output of graphics pipeline 10 is subsequently routed to a frame buffer 18 that includes a color buffer and a depth buffer.

Under OpenGL™ architecture, a graphics application renders a scene by submitting vertex arrays as input to graphics pipeline 10. Graphics pipeline 10 then breaks each vertex array down into primitives and applies vertex shading to each of the primitives. Each primitive is then clipped to the clip volume and clipping planes. After rasterizing each primitive to multiple fragments, graphics pipeline 10 applies fragment shading to each of the fragments. Finally, if a fragment passes a depth test, graphics pipeline 10 outputs the fragment to frame buffer 18 as pixels.

When performing the depth test, a controller (not shown) associated with frame buffer 18 compares the incoming fragment data to the fragment data displayed, and controls the storage of the incoming fragment data accordingly. Specifically, the depth component z for each incoming fragment is compared to the depth component z for the fragment currently being displayed at the same x, y location. If the incoming fragment at that location passes the depth test (i.e., closer to a viewer and is visible to the viewer) against the currently displayed fragment data, then the controller will enable the color and depth buffers of frame buffer 18 to store the data for that incoming fragment (now as pixels). The data associated with the occluded pixels are not stored in the color and depth buffers of frame buffer 18.

For an unsorted scene with high depth complexity, graphics pipeline 10 may overdraw frame buffer 18 many times. Such overdraw is unavoidable because at the time when a fragment is being processed, graphics pipeline 10 does not have all the necessary information to determine whether or not the fragment is going to be visible in a scene. Thus, conservatively, a fragment has to be deemed visible if the fragment passes the depth test, but the fragment may subsequently be overdrawn by another fragment that is closer to a viewer. Hence, graphics pipeline 10 can waste a considerable amount of time in processing invisible fragments. Such waste in processing time is likely to increase with the introduction of vertex and fragment shading and the increasing demand for photo-realistic scenes with a high degree of complexity. If a graphics pipeline can determine the occlusion of a vertex array, primitive or fragment, the graphics pipeline can stop further processing of the vertex array, primitive or fragment at such point. Needless to say, the earlier the graphics pipeline can determine an occlusion of a vertex array, primitive or fragment, the less processing time will be wasted.

In accordance with a preferred embodiment of the present invention, a dual pass occlusion method (DPOM) is used to reduce graphics processing time by computing the occlusion information for all fragments in the view frustum, and such information is called the fragment occlusion information (FOI). DPOM also computes the primitive occlusion information (POI) for all primitives in the view frustum and the vertex array occlusion information (VOI) for all vertex arrays submitted by a graphical application to render a scene. With FOI, a graphics pipeline can disable fragment shading for the occluded fragments. With POI and VOI, a graphics pipeline can reject a primitive and a vertex array, respectively, before the corresponding primitives and vertex arrays reach the vertex shading stage of the graphics pipeline.

Under DPOM, the above-mentioned occlusion information (i.e., FOI, POI and VOI) are computed by using preferably two consecutive pre-processing passes. In order to be practical, the above-mentioned occlusion information are computed without requiring a graphics application to supply any geometric hints and/or spatial relationship information. Preferably, three separate buffers are utilized to store the above-mentioned occlusion information. For example, a fragment result record (FRR) buffer is utilized to store FOI, a primitive result record (PRR) buffer is utilized to store POI, and a vertex array result record (VRR) buffer is utilized to store VOI.

Figure 2A:
FIGS. 2a–2c are block diagrams of various buffers for storing occlusion information, in accordance with a preferred embodiment of the present invention.
Figure 2B:
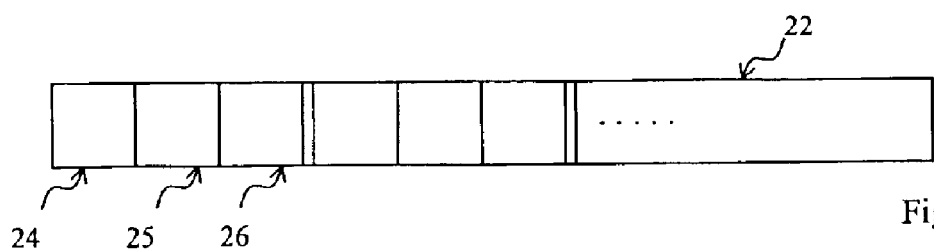
Figure 2C:
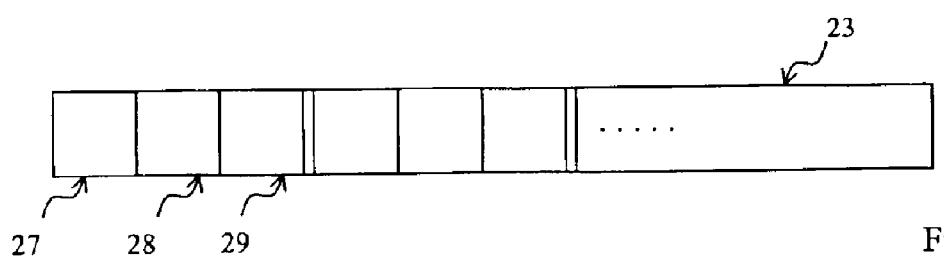

As shown in FIG. 2a, a FRR buffer 21 is a linear (i.e., one-dimensional) buffer having a number of consecutive entries. Each of the entries in FRR buffer 21 is preferably one bit long and contains the FOI of a fragment. As shown in FIG. 2b, a PRR buffer 22 is a linear buffer having a number of entries, with each entry corresponding to a primitive. Each of the entries in PRR buffer 22 contains three fields—a field 24, a field 25 and a field 26. For a primitive, field 24 contains the number of visible fragments within the primitive, field 25 contains the total number of fragments within the primitive, field 26 contains a pointer pointing to the address location in FRR buffer 21 regarding the corresponding fragments for the primitive. As shown in FIG. 2c, a VRR buffer 23 is a linear buffer having a number of entries, with each entry corresponding to a vertex array. Each of the entries in VRR buffer 23 contains three fields—a field 27, a field 28 and a field 29. For a vertex array, field 27 contains the number of visible primitives within a vertex array, field 28 contains the total number of primitives within a vertex array, field 29 contains a pointer pointing to the address location in PRR buffer 22 regarding the corresponding primitives for the vertex array.

Figure 3A:
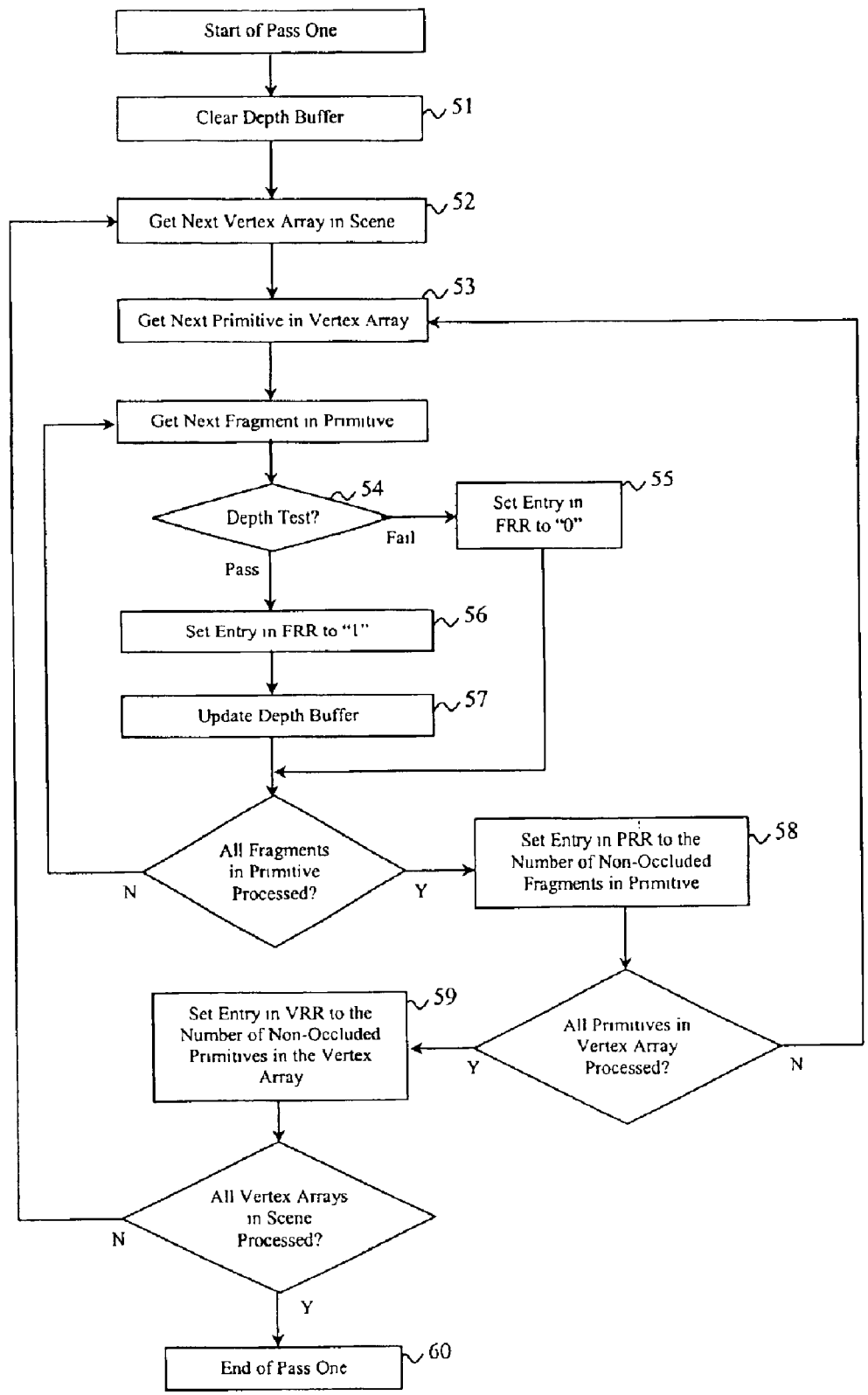
FIGS. 3a–3b are high-level flow diagrams of a method for accelerating occlusion culling in a graphics computer, in accordance with a preferred embodiment of the present invention.
Figure 3B:
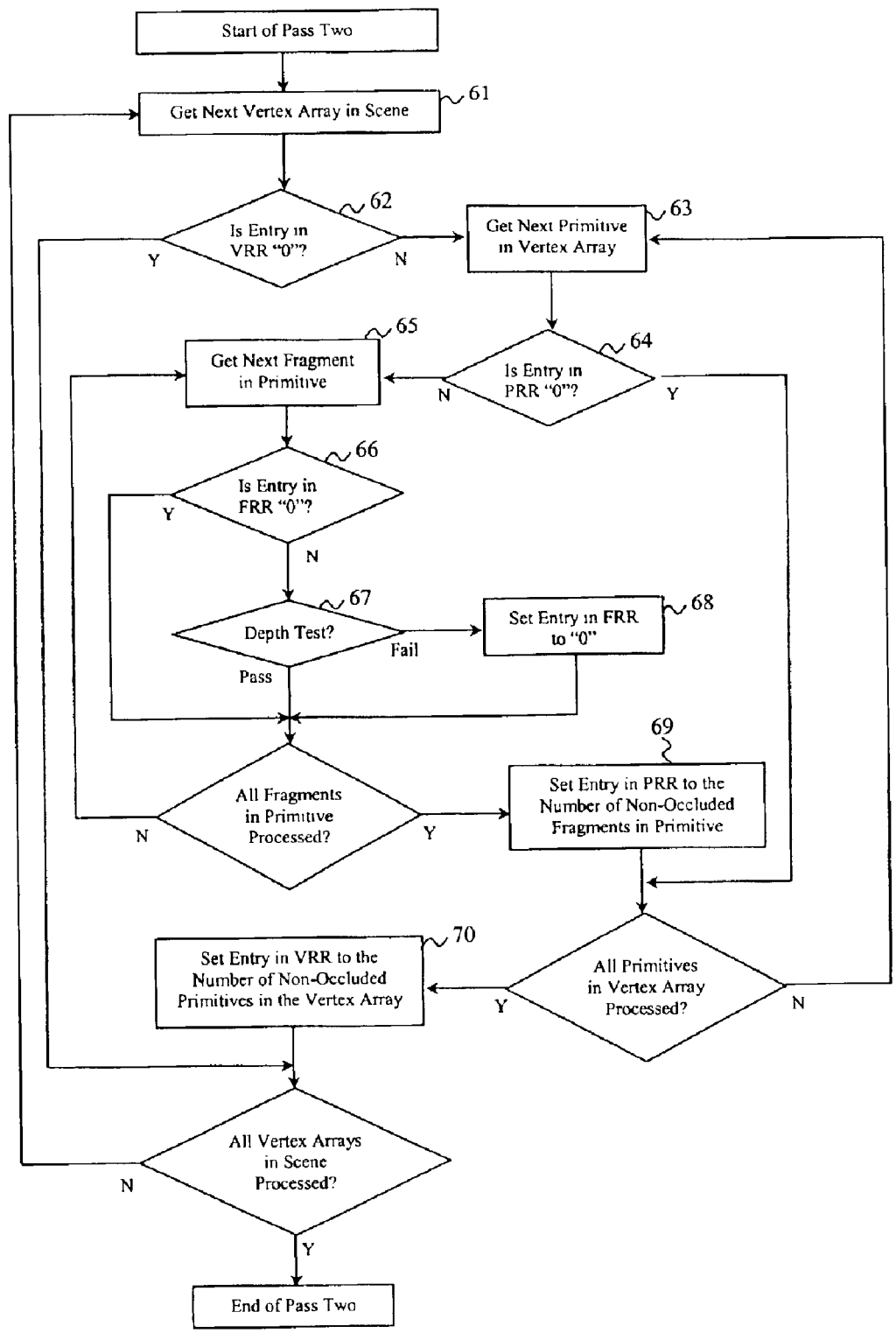

Referring now to FIGS. 3a–3b, there are depicted high-level flow diagrams of a method for accelerating occlusion culling in a graphics computer, in accordance with a preferred embodiment of the present invention. In a first pre-processing pass, a depth buffer within a graphics pipeline is cleared, as shown in block 51. After fetching a vertex array in a scene, as depicted in block 52, the graphics pipeline fetches a primitive within the vertex array, as shown in block 53. For each fragment within the primitive, a depth test (visibility test) is performed using the depth buffer, as depicted in block 54. If the depth test determines that the fragment is occluded, the entry in FRR buffer 21 corresponding to the fragment is set to a logical zero ("0"), as shown in block 55. Otherwise, the entry in FRR buffer 21 corresponding to the fragment is set to a logical one ("1"), as depicted in block 56, and the depth buffer is updated with the depth value of the fragment, as shown in block 57.

After all the fragments within a primitive have been tested, an entry in PRR buffer 22 corresponding to the primitive is updated by counting the number of visible fragments in the primitive for that entry, as shown in block 58. If all the fragments within the primitive are occluded, field 24 for that primitive entry in PRR buffer 22 is set to "0;" otherwise, field 24 for that primitive entry in PRR buffer 22 is set to "1" or the number of non-occluded fragments to imply that primitive is potentially visible.

Similarly, after all the primitives within a vertex array have been tested, an entry in VRR buffer 23 can be updated by counting the number of visible primitives in the vertex array for that entry, as depicted in block 59. If all the primitives in the vertex array are occluded, field 27 for that vertex array entry in VRR buffer 23 is set to "0;" otherwise, field 27 for that vertex array entry in VRR buffer 23 is set to "1" or the number of non-occluded primitives to imply that vertex array is potentially visible. The first pre-processing pass is completed after all the vertex arrays in the scene have been processed, as shown in block 60.

In a second pre-processing pass, the graphics pipeline fetches a vertex array within the scene, as shown in block 61. A determination is made as to whether or not the corresponding entry in VRR buffer 23 has a "0" value, as depicted in block 62. A vertex array entry in VRR buffer 23 with a "0" value can definitely conclude that vertex array as not visible, and the graphics pipeline can stop processing that vertex array at such point. Otherwise, each primitive within the vertex array has to be tested again, as shown in block 63. Thus, a determination is made as to whether or not the corresponding entry in PRR buffer 22 has a "0" value, as depicted in block 64. A primitive entry in PRR buffer 22 with a "0" value can definitely conclude that primitive as not visible, and the graphics pipeline can stop processing that primitive at such point. Otherwise, each fragment within the primitive has to be tested again, as shown in block 65. Thus, a determination is made as to whether or not the corresponding entry in FRR buffer 21 has a "0" value, as depicted in block 66. A fragment entry in FRR buffer 21 with a "0" value can definitely conclude that fragment as not visible, and the graphics pipeline can stop processing that fragment at such point.

For each potentially visible fragment within the primitive, a depth test is performed for a second time, as shown in block 67. If the depth test determines that the fragment is occluded, the entry in FRR buffer 21 corresponding to the fragment is set to a "0" value, as depicted in block 68. After all the fragments within a primitive have been processed, the entry in PRR buffer 22 corresponding to the primitive is set to the number of non-occluded fragments in the primitive, as shown in block 69. Similarly, after all the primitives within a vertex array have been processed, the entry in VRR buffer 23 corresponding to the vertex array is set to the number of non-occluded primitives in the vertex array, as depicted in block 70.

In the second pre-processing pass, the depth buffer is not cleared because all the values in the depth buffer are from visible fragments. All the vertex arrays are processed again and the information in VRR buffer 21, PRR buffer 22 and FRR buffer 23 gathered in the first pre-processing pass are used to simplify processing. Unlike the first DPOM pass, a fragment that is determined to be visible by the visibility test is now definitely visible. By counting the number of visible fragments per primitive, the visibility of a primitive can be determined. By counting the number of visible primitives per vertex array, the visibility of a vertex array can be determined. As such, all results are definitive. Graphics processing can be stopped for definitely occluded vertex arrays, primitives and fragments in the rendering passes.

After the two pre-processing passes, the FOI, POI and VOI are stored in FRR buffer 21, PRR buffer 22 and VRR buffer 23, respectively, for each fragment, primitive and vertex array. For the rendering of a scene, the graphics pipeline can use the information in VRR buffer 23, PRR buffer 22 and FRR buffer 21 to prevent vertex arrays, primitives and fragments, respectively, from passing through the entire graphics pipeline and there is no need to use the depth buffer. Thus, DPOM is more efficient than the prior art when the effort to run the two consecutive preprocessing passes required to compute the occlusion information is less than the effort to shade the occluded fragments and vertices.

A pseudo-code example of DPOM is listed as follows:

```
1    struct FRR
2        bit visible;
3    struct PRR
4        FRR* frr;
5        int vis_frags; //visible fragments
6        int tot_frags; //total fragments
7    struct VRR
8        PRR* prr;
9        int vis_frags; //visible fragments
10       int tot_frags; //total fragments
11       int vis_prims; //visible primitives
```

```
12   struct FRAG;
13   struct PRIM;
14   struct VERTARR;
15   FRR* frr_buffer;
16   PRR* prr_buffer;
17   VRR* vrr_buffer;
18   bool isBlendingDisabled( );
19   bool testDepthBuffer(FRAG* f);
20   updateDepthBuffer(FRAG* f);
21   outputToFrameBuffer(FRAG* f);
22   clearDepthBuffer( );
23   shadePrim(PRIM* p);
24   shadeFrag(FRAG* f);
25   forEach (FRAG* f);
26   forEach (PRIM* p);
27   forEach (VERTARR* v);
28   function pass1( )
29       FRR* fp           = frr_buffer;
30       PRR* pp           = prr_buffer;
31       VRR* vP           = vrr_buffer;
32       clearDepthBuffer( );
33       forEach (VERTARR* v)
34           vp->vis_prims = 0;
35           vp->vis_frags = 0;
36           vp->tot_frags = 0;
37           PRR*  cur_pp       = pp
38           forEach (PRIM* p)
39               cur_pp->vis_frags   = 0;
40               cur_pp->tot_frags   = 0;
41               FRR* cur_fp         = fp;
42               forEach (FRAG* f)
43                   if (testDepthBuffer(f))
44                       cur_fp->visible = 1;
45                       cur_pp->vis_frags++;
46                       if (isBlendingDisabled( ))
47                           updateDepthBuffer(f);
48                   else cur_fp->visible = 0;
49                   cur_pp->tot_frags++;
50                   cur_fp++;
51               if (cur_pp->vis_frags)
52                   cur_pp->frr = fp= cur_fp;
53                   vp->vis_frags+=cur_pp->vis_frags;
54                   vp->tot_frags+=cur_pp->tot_frags;
55                   vp->vis_prims++;
56               cur_pp++;
57           if (vp->vis_prims)
58               vp->prr = pp = cur_pp;
59           vp++;
60   function pass2( )
61       VRR* vp=vrr_buffer;
62       forEach (VERTARR* v)
63           if (vp->vis_prims)
64               vp->vis_prims      = 0;
65               vp->vis_frags      = 0;
66               vp->tot_frags      = 0;
67               PRR* cur_pp             = vp->prr;
68               forEach (PRIM* p)
69                   if (cur_pp->vis_frags)
70                       cur_pp->vis_frags   = 0;
71                       cur_pp->tot_frags   = 0;
72                       FRR* cur_fp              =cur_pp->frr;
73                       forEach (FRAG* f)
74                           if (cur_fp->visible)
75                               if (testDepthBuffer(f))
76                                   cur_fp->visible = 1;
77                                   cur_pp->vis_frags++;
78                               cur_pp->tot_frags++;
79                               cur_fp++;
80                       if (cur_pp->vis_frags)
81                           vp->vis_frags+=cur_pp->vis_frags;
82                           vp->tot_frags+=cur_pp->tot_frags;
83                           vp->vis_prims++;
84                   cur_pp++;
85           vp++;
86   function draw( )
87       VRR* vp=vrr_buffer;
88       forEach (VERTARR* v)
```

```
                -continued
89         if (vp->vis_prims);
90              PRR* pp = vp->prr;
91              forEach (PRIM* p)
92                  if (pp->vis_frags)
93                      shadePrim(p);
94                      FRR* fp = pp->frr;
95                      forEach (FRAG* f)
96                          if (fp->visible)
97                              shadeFrag(f);
98                              outputToFrameBuffer(f);
99                          fp++;
100             pp++;
101        vp++;
```

Lines 1 to 11 of the pseudo code define the various data structures. Lines 15 to 17 of the pseudo code specify the memory pointers to FRR buffer 21, PRR buffer 22 and VRR buffer 23. The functions declared in lines 18 to 22 of the pseudo code are roughly equivalent to the depth and frame buffer operations in the per fragment unit in OpenGL™. The testDepthBuffer( ) function is a less-than depth test. The functions shadePrim( ) and shadeFrag( ) in lines 23 to 24 of the pseudo code execute vertex and fragment programs for vertices and fragments, respectively. The forEach( ) function in line 26 of the pseudo code corresponds to a rasterizer unit. The functions pass1( ) and pass2( ) compute the RR buffers. The draw( ) function renders to the frame buffer using the occlusion information stored in the RR buffers.

For the first DPOM pass, lines 29 to 37 of the pseudo code clear the depth buffer and initializes the data structures. Lines 38 to 41 of the pseudo code apply vertex transformation to a primitive. The vertex transformation is computed using a simplified vertex shading routine, and in most cases, it is the multiplication of the vertex position by a matrix. The simplified vertex shading program and the full vertex shading program must be written such that they compute the same bit exact representation of the vertex position in order for the rasterizer to generate the same fragments for each pass. Lines 42 to 59 of the pseudo code perform the depth test on a fragment and store the result in FRR buffer 21, PRR buffer 22 and VRR buffer 23. Lines 42 to 59 of the pseudo code also update the depth buffer.

For the second DPOM pass, lines 61 to 67 of the pseudo code check if a vertex array is visible and stop processing the vertex array if it is not visible. Lines 68 to 72 of the pseudo code check if a primitive is visible and stop processing the primitive if it is not visible. Lines 73 to 85 of the pseudo code check if a fragment is visible and update FRR buffer 21, PRR buffer 22 and VRR buffer 23. Vertex arrays, primitives and fragments are rejected from further processing based on their occlusion information in their respective buffers 21–23.

The length of each of FRR buffer 21, PRR buffer 22, and VRR buffer 23 is zero at the start of pass1( ) and grows as pass1( ) process each fragment, primitive and vertex array. Each of FRR buffer 21, PRR buffer 22, and VRR buffer 23 reaches its maximum length at the end of pass1( ). Each of FRR buffer 21, PRR buffer 22, and VRR buffer 23 is filled linearly; therefore, it lends itself to memory access optimization techniques such as write combiners. The length of each of FRR buffer 21, PRR buffer 22, and VRR buffer 23 depends on the scene. A graphics application should control the capacity of FRR buffer 21, PRR buffer 22, and VRR buffer 23 because the graphics application has the most knowledge about its scenes. A DPOM buffer overflow flag can be set during the first pass when a buffer reaches its capacity, and the first pass is then terminated. Similar action applies to the second pass. A graphics application should be able to query for the buffer overflow flags. During a rendering pass, an overflow situation is equivalent to DPOM being unable to supply further occlusion information. The graphics pipeline should be able to continue as a non-DPOM enhanced graphics pipeline by using the depth buffer for occlusion culling. Performance registers can count the number of vertex arrays, primitives and fragments rendered without using DPOM. A graphics application can use such information to adjust the buffer capacity accordingly.

FRR buffer 21, PRR buffer 22, and VRR buffer 23 can be stored in a random access memory (RAM). As a result, FRR buffer 21, PRR buffer 22, and VRR buffer 23 can be accessed by graphics applications using the appropriate application programming interface (API) function calls. FRR buffer 21, PRR buffer 22, and VRR buffer 23 can also be accessed by vertex and shading programs during the rendering passes. Since FRR buffer 21, PRR buffer 22, and VRR buffer 23 can consume a significant amount of memory, there are two ways for reducing memory consumption:

1. PRR buffer 22 stores the number of visible fragments and the total number of fragments per primitive (lines 5 to 6 of the pseudo code). These numbers can be replaced by a single bit value, and the bit value records the visibility of the primitive. VRR buffer 23 stores the number of visible primitives, the number of visible fragments and the total number of fragments per vertex array (lines 9 to 11 of the pseudo code). Those numbers can also be replaced by a single bit value, and the bit value records the visibility of the vertex array. The change to single bit values does not affect DPOM because DPOM only needs to know if a primitive or vertex array is visible. The necessary changes to the pseudo-code should be obvious. The drawback of not storing those numbers is that graphics applications, vertex shader and fragment shading program cannot use those numbers.

2. DPOM does not need to use FRR buffer 21. The depth buffer provides equivalent information after the two DPOM passes. The modifications required are as follows: Obviously, the function pass1( ) in the pseudo code does not store the FRR. In pass2( ), since the FRR buffer is not available, line 74 of the pseudo code must be removed and no FRR is stored. In the rendering pass, line 92 of the pseudo code must be replaced by line 75 of the pseudo code. This means that the rendering pass uses the depth buffer instead of FRR buffer 21 to check for visibility. It should be obvious that all references to FRR buffer 21 must be removed.

An application may specify if any or both of the above-mentioned methods should be activated. Hardware implementation of DPOM can be based on an OpenGL™ graphics pipeline with the addition of DPOM specific units and buffers.

Figure 4:
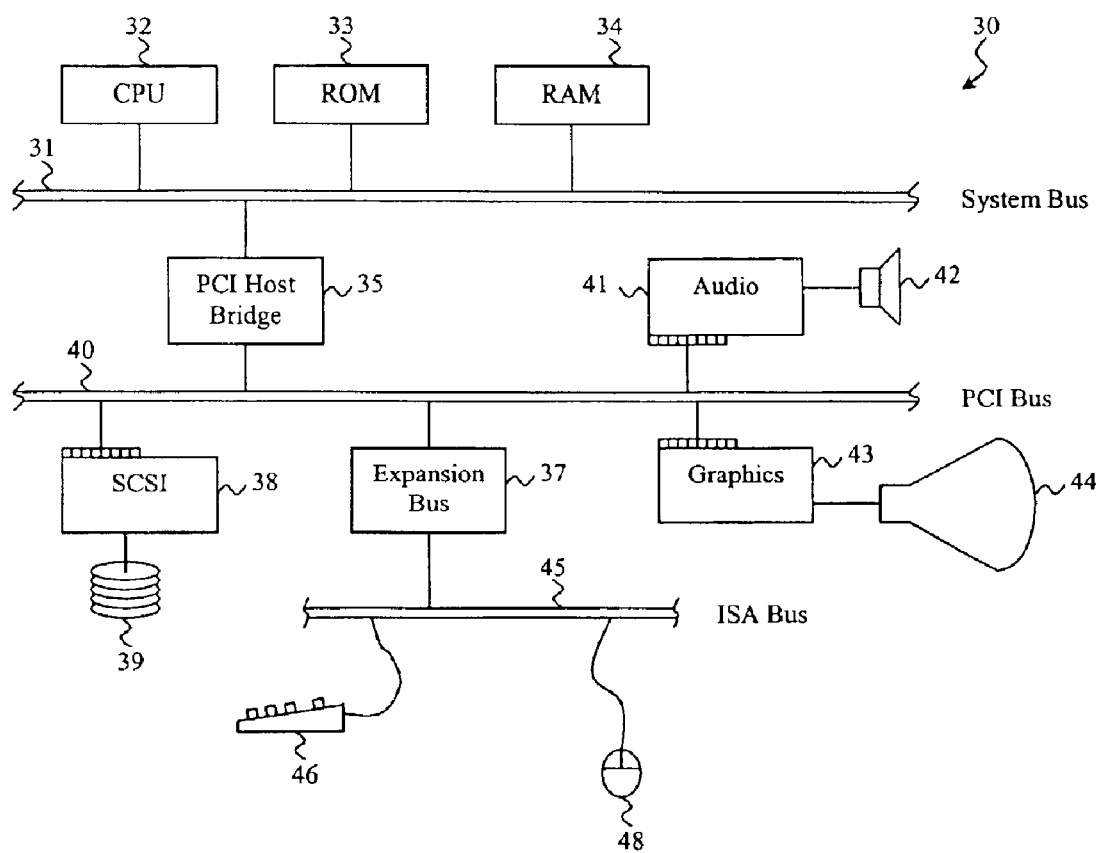
FIG. 4 is a block diagram of a graphics computer having a graphics adapter in which a preferred embodiment of the invention is incorporated.

With reference now to FIG. 4, there is illustrated a block diagram of a graphics computer having a graphics adapter in which a preferred embodiment of the present invention is incorporated. As shown, a graphics computer 30 includes a central processing unit (CPU) 32, a read-only memory (ROM) 33, and a random-access memory (RAM) 34 connected to a system bus 31. CPU 32, ROM 33, and RAM 34 are also coupled to a peripheral components interconnect (PCI) local bus 40 via a PCI host bridge 35 that provides a high bandwidth path for allowing PCI devices to directly access RAM 34.

Also attaching to PCI local bus 40 are a small computer system interface (SCSI) 38 and an expansion bus bridge 37. SCSI 38 is utilized to control high-speed SCSI disk drive 39. Expansion bus bridge 37, such as a PCI-to-ISA bus bridge, is utilized to couple an industry standard architecture (ISA) bus 45 to PCI local bus 40. A keyboard 46 and a mouse 48 are attached to ISA bus 45 for performing certain basic input/output (I/O) functions. In addition, an audio adapter 41 is attached to PCI local bus 40 for controlling audio output through a speaker 42. A graphics adapter 43 is also attached to PCI local bus 40 for controlling visual output through a display monitor 44.

As has been described, the present invention provides an improved method and apparatus for accelerating occlusion culling in a graphics computer. The present invention performs culling at the vertex array, primitive and fragment levels. With the present invention, the execution of vertex and fragment shading programs can be limited to only the primitives and fragments that generate visible pixels.

It is also important to note that although the present invention has been described in the context of a fully functional graphics computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for accelerating occlusion culling within a graphics processing system, said method comprising:
    performing a depth test on all fragments within a primitive to determine if any fragment within said primitive is visible;
    in response to a determination that a fragment is visible, marking said fragment as potentially visible by
        setting an entry within a fragment result record buffer to indicate said fragment is potentially visible, wherein said entry within said fragment result record buffer corresponds to said fragment; and
        updating a count of visible fragments within said a primitive in an entry within a primitive result record buffer, wherein said entry within said primitive result record buffer corresponds to said primitive; and
    in response to said primitive result record buffer having a zero count of visible fragments after said depth test has been performed on all fragments within said primitive, ceasing performing fragment shading on said primitive.

2. The method of claim 1, wherein said entry within said primitive result record buffer further includes a pointer pointing to an address location of a first fragment within said primitive in said fragment result record buffer.

3. The method of claim 1, wherein said method further includes concluding said primitive is not visible when all entries within said fragment result record buffer corresponding to said primitive are marked as not visible.

4. The method of claim 1, wherein said method further includes:
    performing a second depth test on a fragment indicated to be potentially visible to determine if said fragment is visible; and
    in response to a determination that said fragment is visible, marking said fragment as visible.

5. The method of claim 1, wherein said method further includes concluding a vertex array is not visible when all entries within said primitive result record buffer corresponding to said vertex array are marked as not visible.

6. A computer program product residing on a computer usable medium for accelerating occlusion culling within a graphics processing system, said computer program product comprising:
    program code means for performing a depth test on all fragments within a primitive to determine if any fragment within said primitive is visible;
    program code means for marking a fragment as potentially visible, in response to a determination that said fragment is visible, by
        setting an entry within a fragment result record buffer to indicate said fragment is potentially visible, wherein said entry within said fragment result record buffer corresponds to said fragment; and
        updating a count of visible fragments within said primitive in an entry within a primitive result record buffer, wherein said entry within said primitive result record buffer corresponds to said primitive;
    in response to said primitive result record buffer having a zero count of visible fragments after said depth test has been performed on all fragments within said primitive, program code means for ceasing performing fragment shading on said primitive.

7. The computer program product of claim 6, wherein said entry within said primitive results record buffer further includes a pointer pointing to an address location of a first fragment within said primitive in said fragment result record buffer.

8. The computer program product of claim 6, wherein said computer program product further includes program code means for concluding said primitive is not visible when all entries within said fragment result record buffer corresponding to said primitive are marked as not visible.

9. The computer program product of claim 6, wherein said computer program product further includes:
    program code means for performing a second depth test on a fragment indicated to be potentially visible to determine if said fragment is visible; and
    program code means for, in response to a determination that said fragment is visible, marking said fragment as visible.

10. The computer program product of claim 6, wherein said computer program product further includes program code means for concluding a vertex array is not visible when all entries within said primitive result record buffer corresponding to said vertex array are marked as not visible.

11. A graphics adapter capable of accelerating occlusion culling, said graphics adapter comprising:
    means for performing a depth test on all fragments within a primitive to determine if any fragment within said primitive is visible;
    means for marking a fragment as potentially visible, in response to a determination that said fragment is visible, by
        setting an entry within a fragment result record buffer to indicate said fragment is potentially visible, wherein said entry within said fragment result record buffer corresponds to said fragment; and
        updating a count of visible fragments within said primitive in an entry within a primitive result record buffer, wherein said entry within said primitive result record buffer corresponds to said primitive; and in response to said primitive result record buffer having a zero count of visible fragments after said depth test has been performed on all fragments within said primitive, means for ceasing performing fragment shading on said primitive.

12. The graphics adapter of claim 11, wherein said entry within said primitive result record buffer further includes a pointer pointing to an address location of a first fragment within said primitive in said fragment result record buffer.

13. The graphics adapter of claim 11, wherein said graphics adapter further includes means for concluding said primitive is not visible when all entries within said fragment result record buffer corresponding to said primitive are marked as not visible.

14. The graphics adapter of claim 11, wherein said graphics adapter further includes:

means for performing a second depth test on all fragments within said primitive to determine if any fragment within said primitive is visible; and means for, in response to a determination that a fragment is visible, marking said fragment as potentially visible.

15. The graphics adapter of claim 11, wherein said graphics adapter further includes means for concluding a vertex array is not visible when all entries within said primitive result record buffer corresponding to said vertex array are marked as not visible.

* * * * *